C. A. FREDERICKS.
Weighing Scale.

No. 200,386. Patented Feb. 19, 1878.

ATTEST.
Arthur C. Fraser.
Walter W. Scott.

INVENTOR.
Christian A. Fredericks,
Per Burke & Fraser
Attys.

UNITED STATES PATENT OFFICE.

CHRISTIAN A. FREDERICKS, OF BROOKLYN, NEW YORK.

IMPROVEMENT IN WEIGHING-SCALES.

Specification forming part of Letters Patent No. 200,386, dated February 19, 1878; application filed January 2, 1878.

*To all whom it may concern:*

Be it known that I, CHRISTIAN A. FREDERICKS, of Brooklyn, in the county of Kings and State of New York, have invented certain Improvements in Counter-Scales, of which the following is a specification:

This invention relates to that class of scales in which a spiral spring is employed as a resistance to the thing being weighed, and a rack-and-pinion movement causes a pointer or hand to traverse a dial and indicate the weight. In scales of this class it is quite common to provide adjusting screws and nuts in connection with the spring, whereby the tare is regulated. A difficulty has been found, however, in keeping this class of scales in accurate adjustment, owing to the multiplicity and looseness of the joints, and it is therefore difficult to bring the pointer to zero, as there is no direct control of or action on the lever; and it is not unusual to find the pointer, which should stand at zero, moving several ounces out of the way. Another source of error is the improper construction of the rack which revolves the pinion, and in the event of the spring becoming weakened, there is no provision for shortening the weight end of the lever.

To remedy these defects, and to produce a scale that may be perfectly adjustable, and at the same time perfectly reliable, is the object of my present invention, which I will now describe, reference being had to the accompanying drawings, in which—

Figure 1:
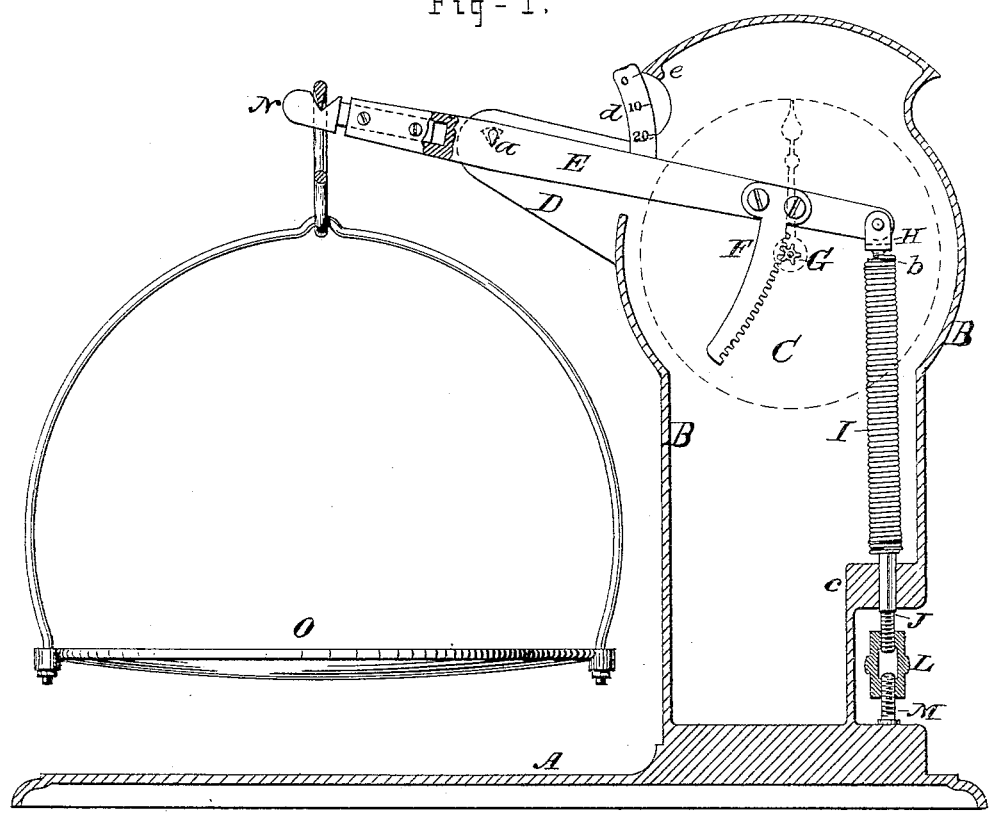
Figure 2:
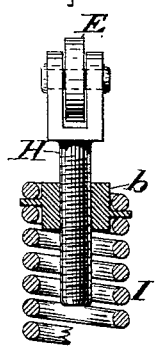
Figure 3:
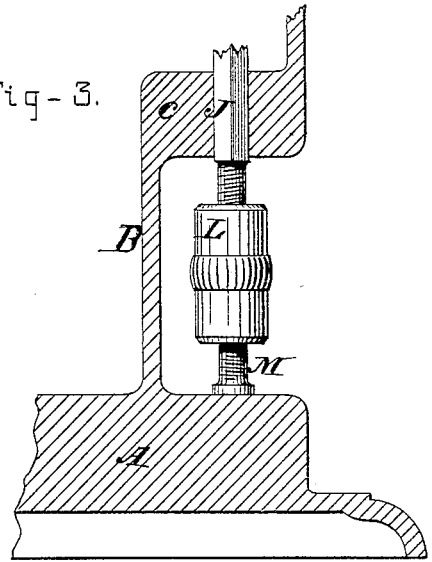

Figure 1 is a vertical mid-section; and Figs. 2 and 3 are detail views, on a larger scale, illustrating the construction.

Let A represent the base, and B the shell, of the scale, the latter bearing one or two dials, C, as desired. D represents one of two arms which project from the shell B, and from bearings for the beam or lever E. F is a curved rack, the pitch-circle of which is drawn with a radius equal to the distance between the bearing $a$ and the pitch-circle of the pinion G. This rack is fixed rigidly to the beam E, or forms a part of the same. To the rear extremity of the lever is hung, by a pin, a screw, H, (see Fig. 2,) having a forked head, the cheeks of which embrace the lever, the pin passing through the three. The threaded shank screws into a cylindrical nut, $b$, which has a spiral flange to engage the spirals of the helical spring I. In adjusting the spring I to the proper length to cause it to weigh correctly, the nut $b$ is screwed down a greater or less distance into the spring I, which has the effect to shorten or lengthen its operative portion. Then, to bring the pointer on the dial to the proper position, the screw H is released from the beam and screwed down into the nut $b$, or unscrewed, as the case may require. The lower end of this spring is attached, in some secure manner, to a square-shanked rod, J, which plays snugly in a correspondingly-shaped bearing or aperture in a thick part, $c$, of the shell or casing, as shown. The lower end of this rod is screw-threaded, and fits snugly in a long adjusting-nut, L, which is provided for half its length with a right-handed thread, and for the other half with a left-handed thread. The lower half of the nut engages a screw, M, fixed rigidly in the base A. The nut L might be threaded only in its upper half, and be connected with the base by a swivel; but as there must necessarily be some play or looseness to allow it to turn, this would impair the efficiency of the scale and defeat the object sought, which is to fix the lower end of the spring I firmly, and at the same time permit easy adjustment for tare.

The adjusting mechanism, consisting of the right and left screws J M and nut L, is of such a character that the lower end of the spring I is held as firmly and steadily as if it were attached directly to the fixed part $c$, while at the same time the scale may be readily adjusted for tare by means of the nut L, the shell or casing being recessed, as shown, to permit access to the nut.

The rack F may be long enough to cause the hand to revolve twice around the dial, and thus weigh twice the amount of the indicated weight. To record these revolutions I provide a short scale, $d$, attached to the lever, and marked in such a way as to designate, by reference to a fixed portion, $e$, of the case or shell, the position of the hand on the dial with reference to the weight. If it has been once around, this scale will show it.

O is the scale-pan, which is suspended from an adjustable extension, N, to the beam E. This extension is arranged to slide out and lengthen the beam, and can be fixed at any desired point by means of set-screws, as shown.

When the scales are put together it may happen that a spring is too strong for the weight. In such a case the extension N may be moved out until the weight has leverage enough to counterbalance the spring. After the scale has been much used and the spring weakened, it may become necessary to lessen the leverage by moving in the extension.

A scale made and carefully adjusted in this manner will not be thrown out of adjustment by casting heavy articles into the pan, and so subjecting the parts to a sudden and severe strain. I may also elect to construct a scale on this principle having the pan mounted on the lever by the usual method, instead of suspending it, as shown in the drawings.

I am aware that curved racks fixed rigidly to the beam are not new with me, and I do not claim such a rack; but I prefer to use such a rack in place of the common straight pivoted rack held to the pinion by a spring.

I claim—

1. In a scale, the means of adjusting the tare and confining the lower end of the spring, consisting of the rod J, arranged to fit closely in the part c, but to move endwise therein, the screw M, fixed rigidly in the base, and the nut L, having a right and left female screw, all arranged substantially as and for the purposes set forth.

2. In a scale, the combination of the spring I with the beam E, forked adjusting-screw H, and flanged nut b, all constructed and arranged substantially as set forth.

3. The combination of the beam E with an extension-piece, N, to support the pan or article to be weighed, the latter being fixed adjustably to the bar, and arranged in such a manner that the distance between the bearing-point a of the lever E and the point of support of the article to be weighed may be altered at will, substantially as and for the purposes set forth.

4. The combination of the screw M, rigidly connected with or forming part of the base A, with the nut L and screw-rod J, by means of which one end of the lever E is directly acted upon and raised or lowered at will, substantially as and for the purposes herein set forth.

In witness whereof I have hereunto signed my name in the presence of two subscribing witnessess.

CHRISTIAN A. FREDERICKS.

Witnesses:
 HENRY CONNETT,
 ARTHUR C. FRASER.